UNITED STATES PATENT OFFICE.

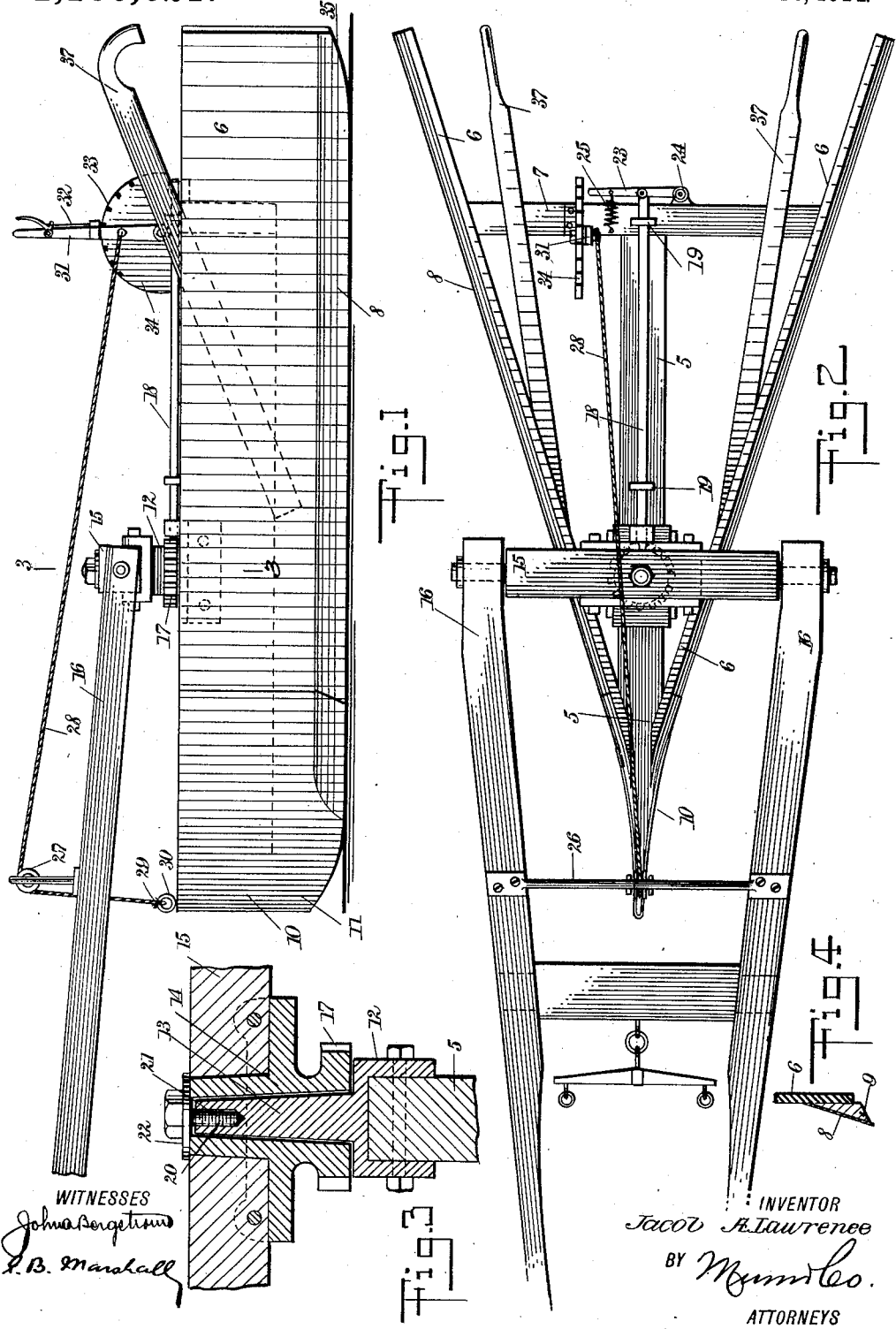

JACOB ALLEN LAWRENCE, OF VALPARAISO, INDIANA.

SNOW-PLOW.

1,100,021.  Specification of Letters Patent.  Patented June 16, 1914.

Application filed May 9, 1911. Serial No. 626,046.

*To all whom it may concern:*

Be it known that I, Jacob A. Lawrence, a citizen of the United States, and a resident of Valparaiso, in the county of Porter and State of Indiana, have invented a new and Improved Snow-Plow, of which the following is a full, clear, and exact description.

My invention relates to snow plows, and it has for its object to provide one having a pivoted thill and draft member to which the tug straps of the harness may be attached, so that the plow may be operated to clean a straight path in the open, in a gutter, or against a building, throwing the snow to either or both sides, and irrespective of drifts, means being provided for locking the draft member in any one of a plurality of positions relatively to the plow.

An additional object of the invention is to provide a tilting device, connected with the draft member, for raising the front of the plow automatically, so that it may readily pass over the curbs and other obstructions.

Still another object of the invention is to so construct the runners of the wings of the plow that there will be a downward pull so that the plow will cut through the snow to the ground.

Still other objects of the invention will appear in the following complete description, in which the preferred form of my invention is described.

In the drawings similar characters of reference denote corresponding parts in all the views, in which—

Figure 1 is a side elevation; Fig. 2 is a plan view of Fig. 1; Fig. 3 is an enlarged sectional view on the line 3—3 of Fig. 1; Fig. 4 is a fragmentary sectional view showing how the runners are mounted on the wings.

By referring to the drawings it will be seen that a longitudinally disposed beam 5 is provided and that the wings 6 are secured to the said beam 5, at its forward end. The wings 6 project below the horizontal plane of the beam 5, and they are continued forwardly, and are secured together below the beam near its forward end, the upper portions of the wings 6 being secured to the sides of the said beam. A transverse frame member 7 is provided, said transverse member being secured to the beam 5, and also to the wings 6. Runners 8 are secured to the outer sides at the bottom of the wings 6, said runners 8 projecting downwardly and outwardly from the said wings, beveled runner attachments 9 being disposed between the runners 8 and the wings 6, the said runner attachments being provided to assist the runners over uneven ground. The forward end of the beam 5 and the forward ends of the wings 6 are engaged by a prow member 10, which is knifelike in shape at its forward end, the bottom of the prow 10 being curved at 11 so that it may readily ride over obstructions. Bolted to the beam 5 there is a bracket 12 to which is secured an upwardly projecting pin 13, the said pin 13 being disposed in a bearing member 14, which in turn is secured to the transversely disposed draft member 15, to which the thills 16 are pivoted. Teeth 17 are formed around the lower portion of the bearing member 14, which teeth are normally engaged by the forward terminal of the rod 18, which is disposed in guides 19, secured to the beam 5, and to the transverse frame member 7. In the top of the pin 13 there is a threaded orifice 20, in which meshes a bolt 21, a washer 22 being held in place by the said bolt 21, the said washer engaging the top of the bearing member 14. A lever 23 is pivoted to the transverse frame member 7 at 24, the said lever 23 being held yieldingly in a predetermined position by the spring 25, one terminal of the said spring 25 being secured to the transverse frame member 7, the other terminal being secured to the lever 23. A transverse rod 26 is disposed between the thills 16, with its terminals secured to the thills, a pulley 27 being secured to the said transverse rod 26. Disposed over the pulley 27 there is a rope 28, one terminal 29 of the said rope being secured to the ring 30, which in turn is secured to the forward end of the beam 5. The said rope 28 is led rearwardly and is secured to the lever 31, which in turn is pivoted to the transverse frame member 7. The said lever 31 is provided with a rod 32, which engages the recesses 33 in the member 34, by which the lever 31 may be held in any desired position relatively to the beam 5.

It will be seen that in using the snow plow, when the thills 16 are raised by the draft animal, as the draft animal steps on an obstruction or a higher level of the ground, the pulley 27, on the transverse rod 26, will draw the rope 28 upwardly, which will carry with it the forward end of the plow. At any time when the operator is desirous of moving the plow over ground upon which the snow has been removed, he may, by operating the lever 31, draw on the cord 28, which will, by the means described, raise the forward end of the plow. In this connection it should be observed that the lower portion 35 at the rear of the wings 6 is rounded off to permit the plow to rock in a manner readily understood. With the handles 37, the operator may guide the plow as it is being drawn by the draft animal.

When the operator is desirous of throwing the snow which is removed by the plow all to one side, he may accomplish this by disengaging the forward terminal of the rod 18 from the teeth 17, by means of the lever 23, which will permit the draft animal to move the thills to one side and when the forward terminal of the rod 18 again engages the teeth 17, the thills will be held in this position relatively to the body of the plow, so that one of the wings will be parallel with the line of movement of the plow, while the other wing will serve to throw the snow to one side. This pivoting of a rigid draft member relatively to the body of the plow is an important feature of the invention, since with it it is possible to plow a straight path, throwing the snow to either side; it is also possible, with a plow constructed as has been described, to clean out gutters, to remove snow from against a building, or to move the plow back and forth across a wide sidewalk, each time throwing the snow in the same direction, so that will eventually all be thrown into the middle of the street.

Having thus described my invention I claim as new and desire to secure by Letters Patent:

1. In a snow plow a body member, a draft member, means for pivotally connecting the draft member with the body member, a cord secured to the front of the body member the cord being disposed over a portion of the draft member and being continued to the rear of the body member, where it is secured.

2. In a snow plow a body member, a draft member, means for pivotally connecting the draft member to the body member, intermediate of the ends of the body member, and a cord secured to the front of the body member, the cord being disposed over a portion of the draft member, and being continued to the rear of the body member, where it is secured.

3. In a snow plow a body member, a draft member, means for pivotally connecting the draft member with the body member on a horizontal axis, and a cord secured to the front of the body member, the cord being disposed over a portion of the draft member and being continued to the rear of the body member, where it is secured.

4. In a snow plow a body member, a draft member, means for pivotally connecting the draft member with the body member on a vertical axis, and a cord secured to the front of the body member, the cord being disposed over a portion of the draft member, and being continued to the rear of the body member, where it is secured.

5. In a snow plow a body member, a draft member, means for pivotally connecting the draft member to the body member, intermediate of the ends of the body member, and on a horizontal axis, a cord secured to the front of the body member, the cord being secured over a portion of the draft member, and being continued to the rear of the body member, where it is secured.

6. In a snow plow a body member, a draft member, means for pivotally connecting the draft member to the body member, intermediate of the ends of the body member, and on horizontal and vertical axes, and a cord secured to the front of the body member, the cord being disposed over a portion of the draft member and being continued to the rear of the body member, where it is secured.

7. In a snow plow a body member having a guide, a draft member, means for pivotally connecting the draft member to the body member on a vertical axis, a toothed member on the draft member, a rod disposed in the guide for engaging the toothed member, and a cord secured to the front of the body member, the cord being disposed over a portion of the draft member, and being continued to the rear of the body member, where it is secured.

8. In a snow plow a body member, a draft member, means for pivotally connecting the draft member to the body member on a horizontal axis, a cord secured to the front of the body member, the cord being disposed over a portion of the draft member and being continued to the rear of the body member, a lever pivoted to the rear of the body member, the cord being secured to the lever, and means for holding the lever in a predetermined position.

In testimony whereof I have signed my name to this specification in the presence of two subscribing witnesses.

JACOB ALLEN LAWRENCE.

Witnesses:
PERRY L. SISSON,
EFFIE M. SISSON.